(12) United States Patent
Jammalamadaka et al.

(10) Patent No.: US 10,598,475 B2
(45) Date of Patent: Mar. 24, 2020

(54) CHECKING OF HIP POINT LOCATION FOR VEHICLE SEATS

(71) Applicant: Lear Corporation, Southfield, MI (US)

(72) Inventors: Sai Prasad Jammalamadaka, Novi, MI (US); Nick Roelli, Milford, MI (US); Larry Bruck, Howell, MI (US)

(73) Assignee: Lear Corporation, Southfield, MI (US)

( * ) Notice: Subject to any disclaimer, the term of this patent is extended or adjusted under 35 U.S.C. 154(b) by 305 days.

(21) Appl. No.: 15/841,600

(22) Filed: Dec. 14, 2017

(65) Prior Publication Data

US 2019/0186889 A1  Jun. 20, 2019

(51) Int. Cl.
*G01B 5/00* (2006.01)
*G01B 5/004* (2006.01)
*B60N 2/90* (2018.01)

(52) U.S. Cl.
CPC ........... *G01B 5/0025* (2013.01); *G01B 5/004* (2013.01); *B60N 2/90* (2018.02)

(58) Field of Classification Search
CPC ...... G01B 5/0025; G01B 5/004; B60N 2/856; B60N 2/859; B60N 2/888; B60N 2/844; B60N 2/4228; B60N 2/6671; B60N 2/6673
USPC .......................................................... 33/545
See application file for complete search history.

(56) References Cited

U.S. PATENT DOCUMENTS

| | | | | |
|---|---|---|---|---|
| 3,147,617 A | * | 9/1964 | Kaptur, Jr. ............. | A61B 5/103 73/172 |
| 5,456,019 A | * | 10/1995 | Dowell ................ | G01B 5/0025 33/1 M |
| 5,641,917 A | | 6/1997 | Hurite et al. | |
| 5,737,845 A | * | 4/1998 | Marasus .............. | G01B 5/0025 33/1 M |
| 5,845,967 A | * | 12/1998 | Kane ..................... | B60N 2/2806 297/250.1 |
| 6,079,780 A | * | 6/2000 | Bapst ................... | B60N 2/2806 116/200 |

(Continued)

FOREIGN PATENT DOCUMENTS

| | | |
|---|---|---|
| CN | 204346287 U | 5/2015 |
| DE | 102012022811 A1 | 5/2013 |

OTHER PUBLICATIONS

General Motors Company, "H-Point Measurement: Audit", GM Test Procedure, Feb. 2016, pp. 1-10.

(Continued)

*Primary Examiner* — Yaritza Guadalupe-McCall
(74) *Attorney, Agent, or Firm* — MacMillan, Sobanski & Todd, LLC

(57) ABSTRACT

A production line a first conveyor for advancing assembled vehicle seats to a checking station and a second conveyor for advancing each of the checked seats to a subsequent station, the nature of the subsequent station depending on as-built coordinates relating to each of the vehicle seats and determined by the checking station. The checking station includes a displacement mechanism and a detector. The displacement mechanism displaces a hip point fixture between a first standby position and a second test position in which the hip point fixture is depressed into each of the vehicle seats to simulate a load. The detector determines the as-built coordinates, at least one such as-built coordinate being determined from a location on the hip point fixture.

20 Claims, 11 Drawing Sheets

(56) References Cited

U.S. PATENT DOCUMENTS

2019/0186889 A1* 6/2019 Jammalamadaka ... G01B 5/004

OTHER PUBLICATIONS

SAE International, "Devices for use in Defining and Measuring Vehicle Seating Accommodation", Mar. 2008, pp. 1-31.
SAE International, "Motor Vehicle Dimensions", Jun. 1984, pp. 34.54-34.72.

* cited by examiner

CHECKING OF HIP POINT LOCATION FOR VEHICLE SEATS

BACKGROUND OF THE INVENTION

This invention relates in general to production of vehicle seats and in particular to a method of checking a hip point location of the vehicle seats.

A hip point location (or H-point) of a vehicle seat is defined by SAE Standard J1100 for "Motor Vehicle Dimensions" and represents a location of a hip joint of an occupant of the vehicle seat. The hip point is located by manually positioning a hip point manikin or machine (HPM) complying with SAE Standard J826 for "Devices for Use in Defining and Measuring Vehicle Seating Accommodation" in the vehicle seat. Positioning the hip point manikin in the vehicle seat is a time intensive procedure that involves repeatedly loading, weighting, and leveling different portions of the hip point manikin.

With the hip point manikin correctly positioned in the vehicle seat, the hip point for the vehicle seat is located by markings on the hip point manikin. Measurements using the hip point may then be made. Typically, the measurements are made using a coordinate measuring machine such as a FaroArm. For example, measurements using the hip point may be made to check or test whether the vehicle seat complies with its design or other standards. Other vehicle systems depend on the vehicle seat complying with its design standard because the vehicle seat positions its occupant in a vehicle. For example, safety systems such as seat belts and airbags depend on the vehicle seat complying with its design standards and placing its occupant in an expected position in the vehicle.

It is cost prohibitive to test every vehicle seat according to the SAE Standard J826. According to the SAE Standard J826, positioning the hip point manikin in the vehicle seat, and any measurements made afterwards, are manual processes performed in a lab environment and require extended time. For example, the positioning of the hip point manikin and measurements may require half a day to perform. Additionally, the lab environment is typically away from a production site for the vehicle seats, which requires time for transport and risks damage to the seats during handling, and the hip point manikin requires repositioning—i.e., reweighting, reloading, and releveling—between different vehicle seats being checked, including between two vehicle seats of identical design. Consequently, a statistical sample is used to represent the vehicle seats not checked, but such statistical analysis is not as accurate as checking every vehicle seat produced. Furthermore, the manual process for checking the hip point location is subject to human error. Thus, there is a need for an improved process that allows checking of the hip point location for every vehicle seat produced while maintaining production of the vehicle seats.

SUMMARY OF THE INVENTION

This invention relates to production of vehicle seats in which a hip point location of the vehicle seats is checked.

According to one embodiment, a production line for vehicle seats may comprise first and second conveyors. The first conveyor advances each of the vehicle seats to a checking station after assembly and the second conveyor advances each of the checked seats to a subsequent station. The checking station includes a displacement mechanism and a detector. The displacement mechanism displaces a hip point fixture between a first standby position and a second test position in which the hip point fixture is depressed into each of the vehicle seats to simulate a load. The detector determines as-built coordinates for each of the vehicle seats, at least one such as-built coordinate being determined from a location on the hip point fixture. The nature of the subsequent station depends on the as-built coordinates relating to each of the assembled vehicle seats and determined by the checking station.

The at least one as-built coordinate determined from the location on the hip point fixture may be determined by a laser and optical receiver assembly. A laser and optical receiver assembly may also determine a second as-built coordinate from a reference datum for each of the vehicle seats, wherein the reference datum is on a pallet advancing the vehicle seats on the first and second conveyors. Furthermore, a laser and optical receiver assembly may determine a second as-built coordinate from a pivot point of each of the vehicle seats, wherein seat backs are hinged to seat bottoms for each of the vehicle seats at the pivot point.

The displacement mechanism may linearly displace the hip point fixture between the first standby position and the second test position. In another embodiment, the displacement mechanism may linearly displace the hip point fixture between the first standby position and an intermediate position and then angularly displace the hip point fixture between the intermediate position and the second test position. In a further embodiment, the displacement mechanism may angularly displace the hip point fixture between the first standby position and the intermediate position and then linearly displace the hip point fixture between the intermediate position and the second test position. In another embodiment, the displacement mechanism may angularly displace the hip point fixture between the first standby position and the second test position.

The production line may further comprise at least one assembly station. The vehicle seats are assembled by the at least one assembly station. The first conveyor advances the vehicle seats from the at least one assembly station to the checking station.

According to another embodiment, a method of checking as-built coordinates of a plurality of assembled vehicle seats may comprise receiving each of the vehicle seats at a checking station, displacing a hip point fixture into each of the vehicle seats between a first standby position and a second test position, and determining the as-built coordinates relating to the vehicle seat. In the second test position, the hip point fixture is depressed into the vehicle seats to simulate a load. At least one such as-built coordinate is determined from a location on the hip point fixture.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
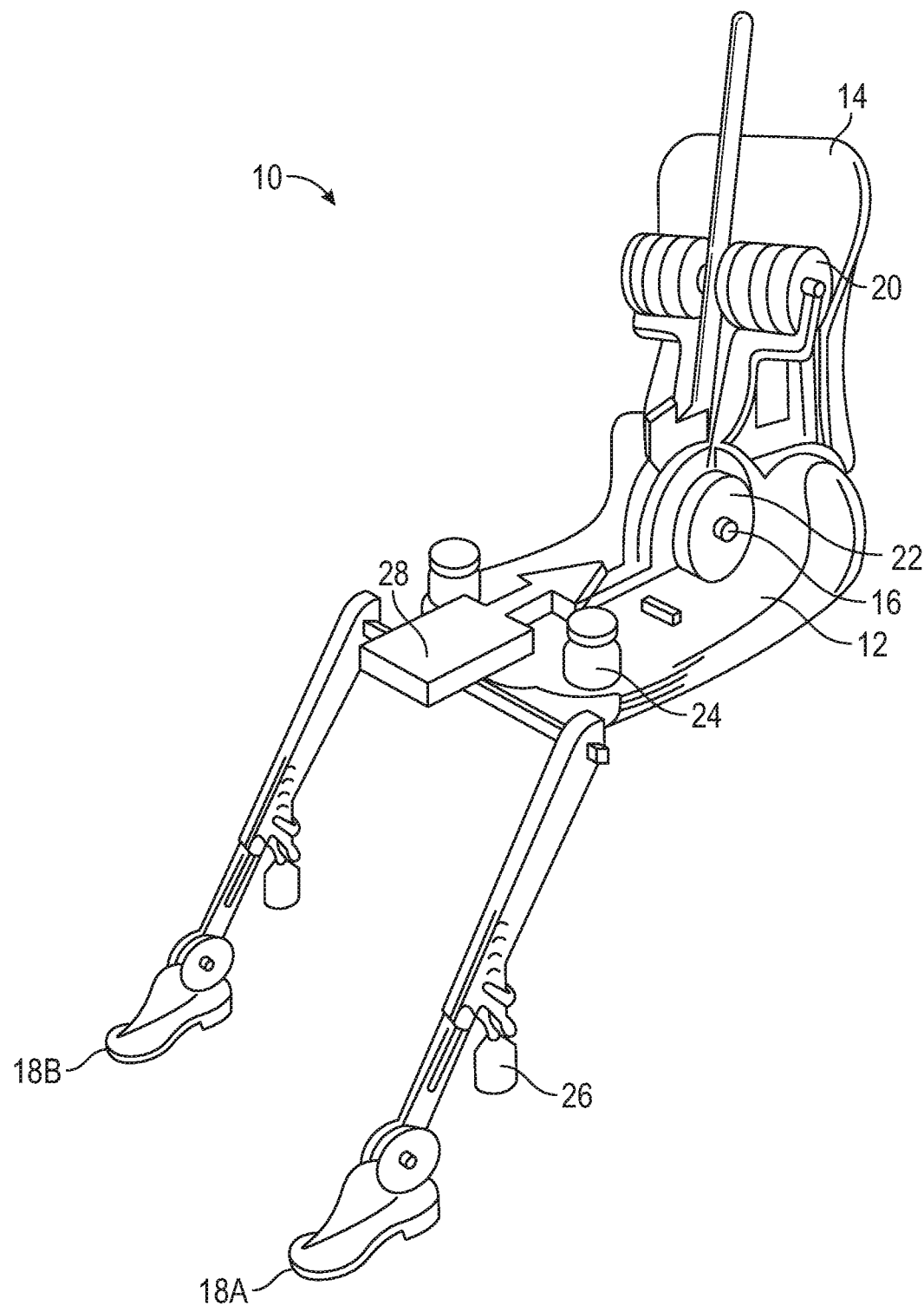
FIG. 1 is a perspective view of a prior art hip point manikin used to manually check a hip point location of a vehicle seat.

Referring now to FIG. 1, there is illustrated a prior art hip point manikin (HPM), indicated generally at 10. The hip point manikin 10 is used for manually locating a hip point location (or H-point) of a vehicle seat (not illustrated) and complies with SAE Standard J826 for "Devices for Use in Defining and Measuring Vehicle Seating Accommodation," which is hereby incorporated herein by reference in entirety.

The hip point manikin 10 includes a cushion pan 12 and a back pan 14 pivotally connected to the cushion pan 12. On a pivot between the cushion pan 12 and back pan 14 is a hip point sight button 16. Extending from the cushion pan 12 are first and second lower leg assemblies 18A and 18B, respectively. Attached to and weighing down the hip point manikin 10 are torso weights 20, buttock weights 22, thigh weights 24, and leg weights 26. During positioning in the vehicle seat, loads are applied to the hip point manikin 10 in a direction 28.

The hip point manikin 10 is manually positioned in the vehicle seat to manually locate the hip point location of the vehicle seat. First, the vehicle seat is conditioned to a lab environment in which the vehicle seat will be checked and prepped for positioning of the hip point manikin 10 in the vehicle seat. Then, the hip point manikin 10 is placed in the vehicle seat without the torso weights 20, buttock weights 22, thigh weights 24, and leg weights 26. The unweighted hip point manikin 10 is leveled, then the torso weights 20, buttock weights 22, thigh weights 24, and leg weights 26 are placed on the hip point manikin 10. In between placing each of the torso weights 20, buttock weights 22, thigh weights 24, and leg weights 26 on the hip point manikin 10, the hip point manikin 10 is externally loaded in the direction 28 and repeatedly releveled. Once the hip point manikin 10 is properly weighted, loaded, and leveled, the hip point position is recorded by measuring to the hip point sight button 16.

Figure 2:
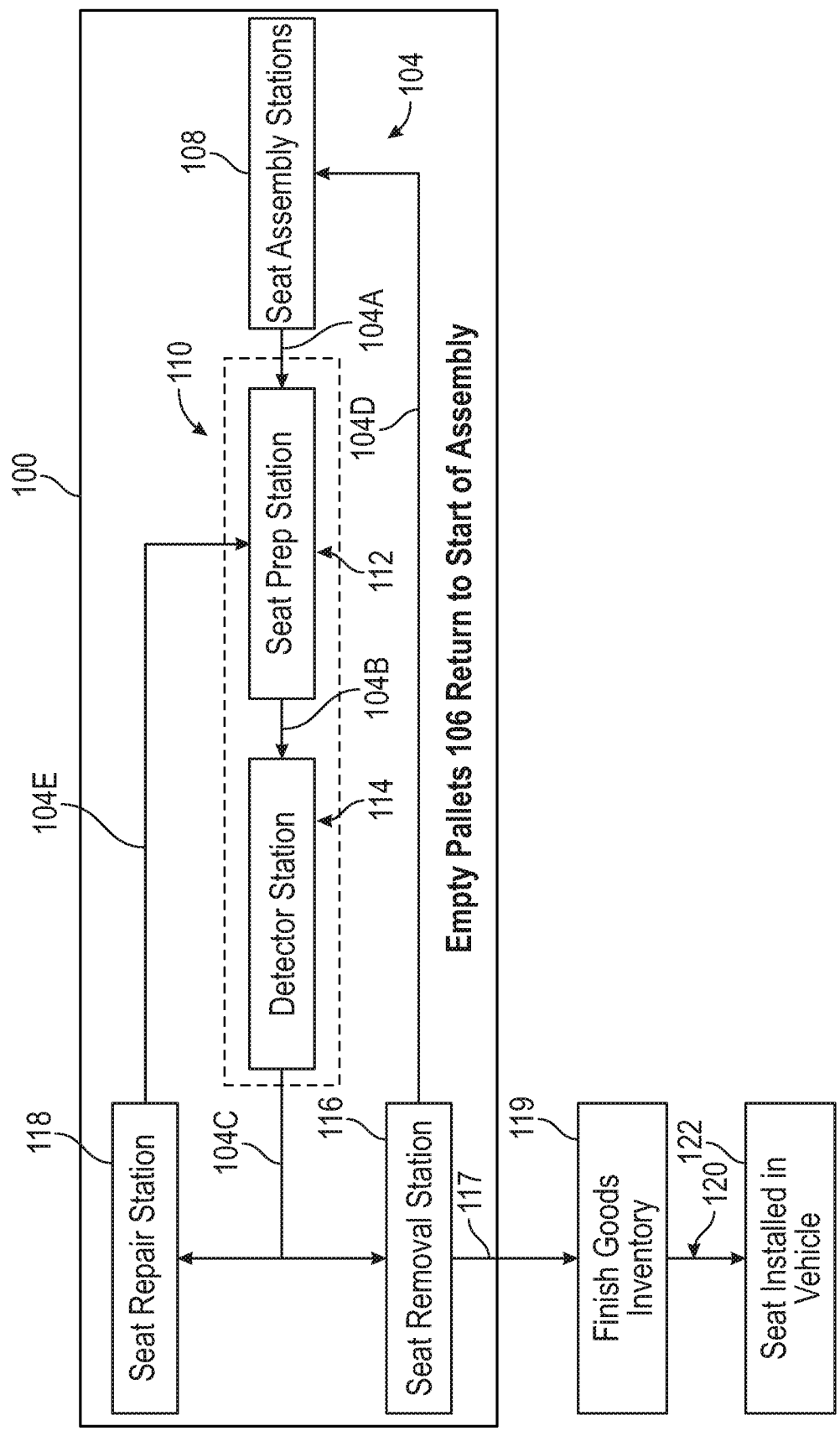
FIG. 2 is a schematic view of a production line for vehicle seats, the production line having a checking station with linear displacement in accordance with a first embodiment of this invention.
Figure 3:
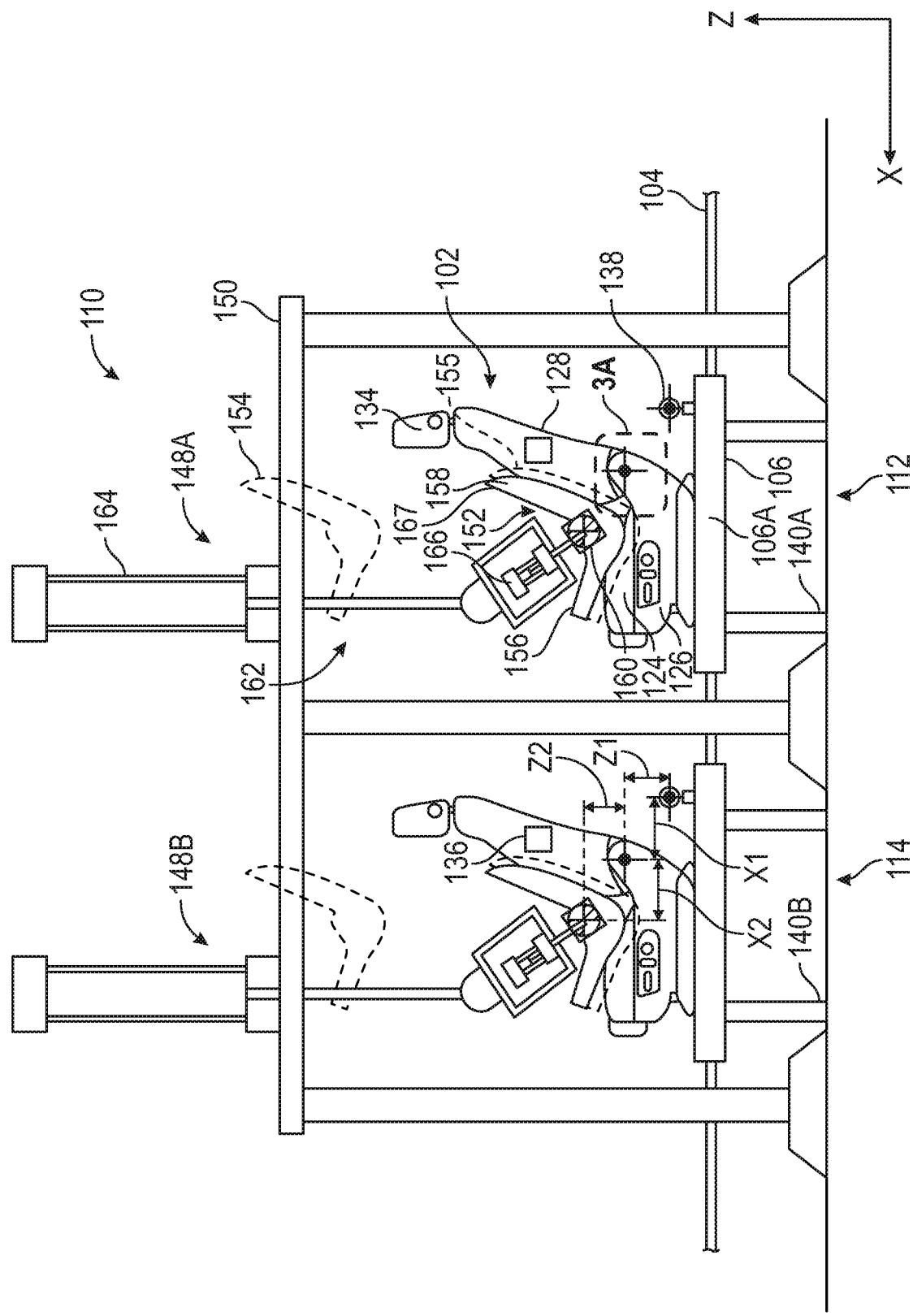
FIG. 3 is a side elevation view of the checking station of FIG. 2.
Figure 3A:
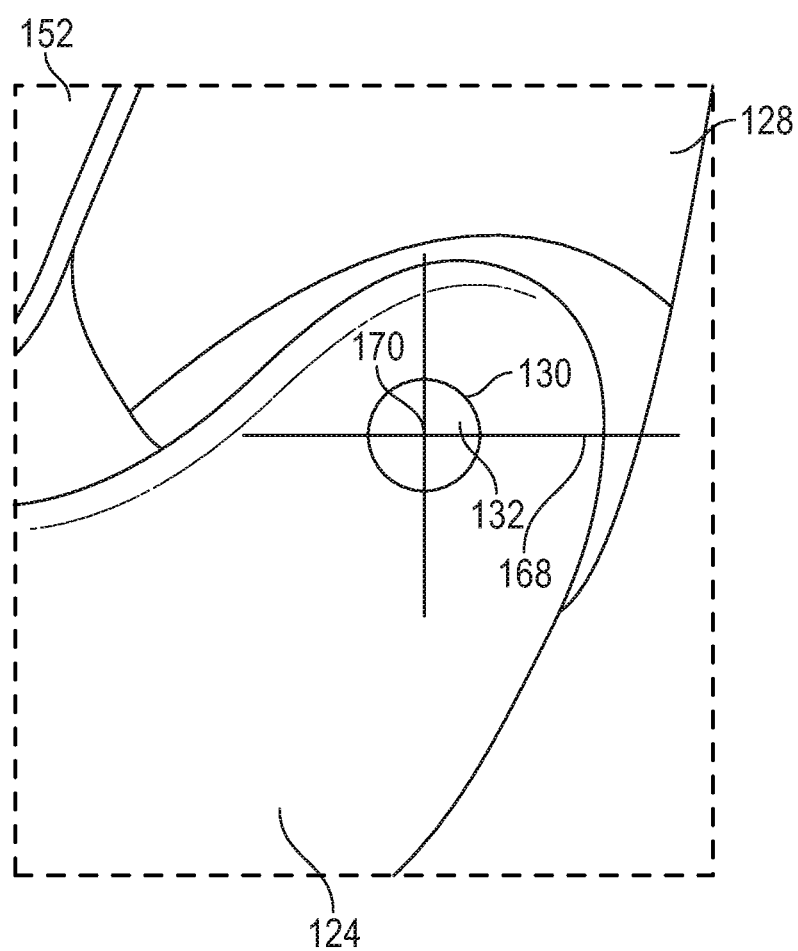
FIG. 3A is an enlarged portion of FIG. 3.
Figure 4:
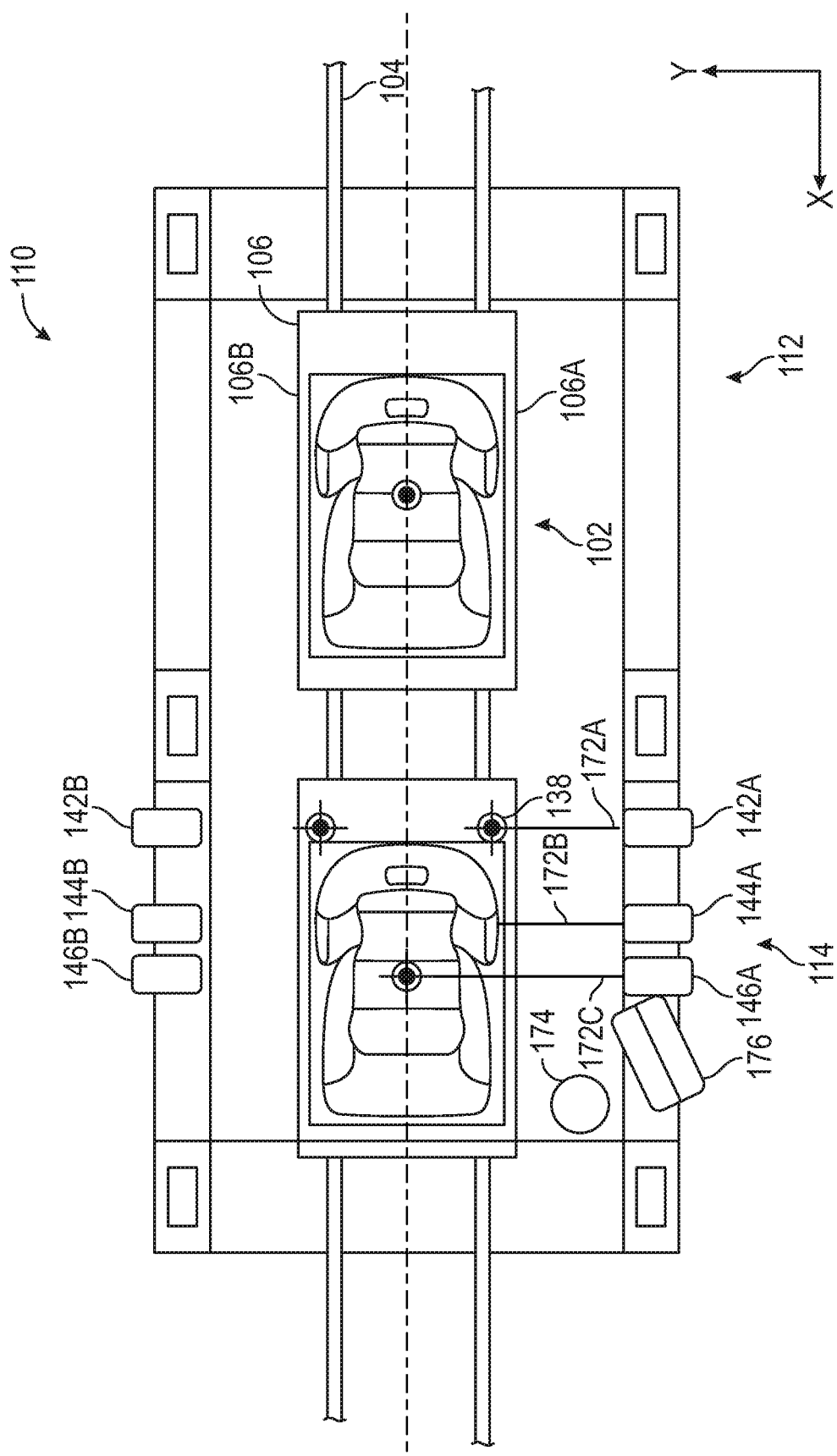
FIG. 4 is a top plan view of the checking station of FIG. 2.

Referring now to FIG. 2, there is illustrated one embodiment of a production or manufacturing system 100 for vehicle seats, indicated generally at 102 (shown in FIGS. 3 and 4). As non-limiting examples, the vehicle seats 102 may be for a passenger or driver side of a vehicle in which the vehicle seats 102 will be installed. As further non-limiting examples, the vehicle seats 102 may be a driver seat, passenger seat, rear row captain seat, rear row bench seat, or 20% seat.

The vehicle seats 102 advance through the production line 100 on a conveyor, indicated generally at 104. Specifically, the vehicle seats 102 may be carried by pallets 106 (shown in FIGS. 3 and 4) that are advanced through the production line 100 on the conveyor 104. Alternatively, the vehicle seats 102 may advance through the production line 100 on pans, skillets, carriages, or other frameworks, structures, or mechanisms supporting or conveying the vehicle seats 102 for advancement on the conveyor 104. The vehicle seats 102 advance through the various stations of the production line 100 on the conveyor 104.

The vehicle seats 102 advance from one or more seat assembly stations 108 on a first conveyor portion 104A to a seat checking station, indicated generally at 110. As illustrated, the checking station comprises separate seat preparation and detector stations, indicated generally at 112 and 114 respectively, connected by a second conveyor portion 104B. The vehicle seats 102 advance from the seat preparation station 112 to the detector station 114 on the second conveyor portion 104B.

The seat preparation station 112 prepares the vehicle seats 102 for determining of as-built coordinates by the detector station 114. The seat preparation station 112 prepares the vehicle seats 102 by applying and removing a load to each of the vehicle seats 102. After removing the load, the seat preparation station 112 allows the vehicle seats 102 to recover. The detector station 114 determines the as-built coordinates of the vehicle seats 102. The detector station 114 determines the as-built coordinates of the vehicle seats 102 by again applying a load to each of the vehicle seats 102 and then, while the vehicle seats 102 are loaded, using laser and optical receiver assemblies to determine—i.e., measure—the as-built coordinates. Both the seat preparation station 112 and detector station 114 will be discussed further with reference to FIGS. 3 and 4.

In an alternative embodiment, the seat preparation and detector stations 112 and 114, respectively, may be combined into a single combined station and the second conveyor portion 104B omitted. The single combined station both prepares the vehicle seats 102 for determining of the as-built coordinates and determines the as-built coordinates. The single combined station applies and removes the load from each of the vehicle seats 102, allows the unloaded vehicle seats 102 to recover, again applies the load to each of the vehicle seats 102, and determines the as-built coordinates of each of the loaded vehicle seats 102.

In a further alternative embodiment, the seat preparation station 112 may be omitted from the checking station 110. The second conveyor portion 104B would also be omitted. When the seat preparation station 112 is omitted, the checking station 110 is the same as the detector station 114. The first conveyor portion 104A advances the vehicle seats 102 to the detector station 114. The detector station 114 then determines the as-built coordinates without first preparing the vehicle seat 102 for determining the as-built coordinates—i.e., the vehicle seats 102 are only loaded once while the detector station 114 determines the as-built coordinates. The detector station 114 loads each of the vehicle seats 102 once and determines the as-built coordinates while the vehicle seats 102 are loaded.

After the checking station 110, a branched third conveyor portion 104C advances the checked vehicle seats 102 to a subsequent station. The as-built coordinates are within a coordinate system for designing, assembling, and checking or testing the vehicle seats 102. When the as-built coordinates determined for the vehicle seats 102 by the detector station 114 are within a specification for the as-built coordinates, the vehicle seats 102 advance on the third conveyor portion 104C to a seat removal station 116. When the as-built coordinates are not within the specification, the vehicle seats 102 advance on the third conveyor portion 104C to a seat repair station 118.

The seat removal station 116 removes the vehicle seats 102 from the conveyor 104 for storage until installation in the vehicle. A storage connection 117 transfers the vehicle seats 102 from the seat removal station 116 to finish goods inventory 119. As a non-limiting example, the storage connection 117 may be a conveyor. A delivery connection 120 then advances specific vehicle seats 102 from the finish goods inventory 119 to the seat installation station 122 when the specific vehicle seats 102 are needed. After the vehicle seats 102 are removed from the conveyor 104, a fourth conveyor portion 104D returns the empty pallets 106 back to the seat assembly stations 108.

The delivery connection 120 is any suitable connection, mechanism, or transport vehicle to advance or move the vehicle seats 102 from the production line 100 to the seat installation station 122. As a first non-limiting example, the delivery connection 120 may be a continuation of the conveyor 104 when the seat production line 100 and the seat installation station 122 are at a common location or site. As a second non-limiting example, the delivery connection 120 may comprise shipping the vehicle seats 102 by truck from the seat production line 100 to the seat installation station 122 when the seat production line 100 and seat installation station 122 are at different locations or sites.

The seat repair station 118 performs any repair, remedial, or other corrective action to the vehicle seats 102 with the as-built coordinates not within the specification. A fifth conveyor portion 104E then advances the repaired vehicle seats 102 to the checking station 110 for rechecking of the as-built coordinates.

As illustrated in the embodiment of FIG. 2, the conveyor 104 is a single, common conveyor for each of the seat assembly stations 108 and checking station 110 and further between the seat assembly stations 108 and the checking station 110. In an alternative embodiment, the seat assembly stations 108 may be on a first conveyor and the checking station 110 on a second conveyor, wherein the first and second conveyors are separate conveyors. As a non-limiting example, the first conveyor for the seat assembly stations 108 may be at a seat assembly plant and the second conveyor for the checking station 110 may be at the finish good inventory 119 or a vehicle assembly plant, wherein the seat assembly plant and finish good inventory 119 or vehicle assembly plant are at different geographic locations such that the vehicle seats 102 are removed from the first conveyor, shipped by truck or some other delivery connection to the second conveyor, and then placed on the second conveyor for the checking station 110.

Referring now to FIGS. 3-4, the checking station 110 will be discussed in detail.

As illustrated in FIGS. 3-4, each of the vehicle seats 102 has a seat cushion 124 on a seat bottom 126 and a seat back 128, wherein the seat back 128 is hinged with the seat bottom 126 at a pivot point 130. As a non-limiting example, the pivot point 130 is a center of rotation for the seat back 128 and may comprise a hollow tubular member extending laterally across the seat bottom 126, with an opening 132. The opening 132 is preferably on an inboard side (when installed in the vehicle) of each of the vehicle seats 102. Alternatively, the opening 132 may be on an outboard side of the vehicle seats 102. Connected to the seat back 128 is a headrest 134.

Each of the vehicle seats 102 further has a corresponding seat record 136 containing the as-built coordinates and other data pertaining to the specific vehicle seat the seat record 136 corresponds to. As non-limiting examples, the other data may be the specification, design data, materials used, or material sourcing for the specific vehicle seat. As non-limiting examples, the seat record 136 may be maintained as an electronic record in a computer database, as physical documentation attached to the vehicle seat, or otherwise kept. The seat record 136 are preferably maintained for at least the service life of the vehicle seats 102. Each of the seat records 136 may be cross referenced with a vehicle identification number (VIN) for the vehicles in which each of the vehicle seats 102 are installed.

The pallets 106 each have a left side 106A and a right side 106B. The left and right sides 106A and 106B, respectively, extend in a horizontal direction X in which the conveyor 104 advances through the checking station 110. Fixed to each of the pallets 106 is a reference datum 138. As illustrated, the reference datum 138 is provided on both left and right sides 106A and 106B, respectively, of each of the pallets 106 (as shown in FIG. 4). Alternatively, a single datum 138 may be provided at a lateral midpoint of the pallets 106.

The seat preparation station 112 has a first lift mechanism 140A and the detector station 114 has a second lift mechanism 140B. Discussion of one of the first or second lift mechanisms 140A or 140B, respectively, applies to the other of the first or second lift mechanisms 140A or 140B, respectively, unless otherwise noted. When the seat preparation station 112 and detector station 114 are combined into a single station, then only a single lift mechanism is provided. The first and second lift mechanisms 140A and 140B, respectively, raise and lower the pallets 106 in a vertical direction Z. The vertical direction Z is perpendicular to the horizontal direction X.

Each of the seat preparation and detector stations 112 and 114, respectively, has a locating mechanism (not shown) to locate each of the pallets 106 to a known position in a horizontal X-Y plane and a clamping mechanism (not shown) to secure each of the pallets 106 independently in the X-Y plane. The locating mechanisms have the same arrangement for both the seat preparation and detector stations 112 and 114, respectively. As non-limiting examples, the locating mechanisms may be retractable pins and the clamping mechanisms may be clamping cylinders. Preferably, the retractable pins are located on the clamping mechanisms.

Arrayed along the left side 106A in the detector station 114 are detectors in the form of first, second, and third left side laser and optical receiver assemblies 142A, 144A, and 146A, respectively, each mounted on a separate servo mechanism. Similarly, arrayed along the right side 106B in the detector station 114 are additional detectors in the form of first, second, and third right side laser and optical receiver assemblies 142B, 144B, and 146B, respectively, each also mounted on a separate servo mechanism. Alternatively, any of the first, second, and third left side laser and optical receiver assemblies 142A, 144A, and 146A, respectively, or first, second, and third right side laser and optical receiver assemblies 142B, 144B, and 146B, respectively, may be manually positioned or moved to capture the as-built coordinates. Alternatively, the lasers and optical receivers may be separate assemblies. Discussion of one of the first, second, or third left side laser and optical receiver assemblies 142A, 144A, or 146A also applies to the corresponding first, second, or third right side laser and optical receiver assemblies 142B, 144B, and 146B, and vice versa.

As will be discussed, the first, second, and third left side laser and optical receiver assemblies 142A, 144A, and 146A, respectively, and first, second, and third right side laser and optical receiver assemblies 142B, 144B, and 146B, respectively, determine the as-built coordinates for each of the vehicle seats 102, including as-built coordinates for the hip point location of each of the vehicle seats 102. Laser and optical receiver assemblies such as the first, second, and third left side laser and optical receiver assemblies 142A, 144A, and 146A, respectively, and first, second, and third right side laser and optical receiver assemblies 142B, 144B, and 146B, respectively, are well known in the automotive and other industries and thus will not be described in detail. As a non-limiting example, the laser and optical receiver assemblies may be the same technology as used by a universal product code (UPC) scanner in a store.

In the illustrated embodiment, inclusion of both left and right side laser and optical receiver assemblies for the detector station 114 allows both passenger and driver side vehicle seats 102 to be checked by the same detector station 114. In an alternative embodiment, separate detector stations 114 may be used for passenger and driver side vehicle seats 102.

The seat preparation station 112 has a first displacement mechanism 148A and the detector station 114 has a second displacement mechanism 148B. Discussion of one of the first or second displacement mechanisms 148A or 148B, respectively, also applies to the other of the first or second displacement mechanisms 148A or 148B, respectively, unless otherwise noted. When the seat preparation station 112 and detector station 114 are combined into a single station, then only a single displacement mechanism is provided. The first and second displacement mechanisms are supported over the conveyor 104 on a gantry 150 or other support framework or structure.

Secured to each of the first and second displacement mechanisms 148A and 148B, respectively, is a hip point fixture, indicated generally at 152. Preferably, the hip point fixtures 152 are interchangeable between the first and second displacement mechanisms 148A and 148B, respectively. Each of the first and second displacement mechanisms 148A and 148B, respectively, displaces one of the hip point fixtures 152 between a first standby or retracted position 154 (indicated by dashed lines in FIG. 3) and a second test position 155 (indicated by dashed lines in FIG. 3). As will be discussed, in the test position 155, the hip point fixtures 152 have been depressed into the vehicle seats 102. Discussion of one of the first or second displacement mechanisms 148A or 148B, respectively, also applies to the other of the first or second displacement mechanisms 148A or 148B, unless otherwise noted. Similarly, discussion of one of the hip point fixtures 152 applies to the other of the hip point fixtures 152, unless otherwise noted. The hip point fixtures 152 are not regularly adjusted between applications to the vehicle seats 102 as is required for the hip point manikin 10.

Each of the hip point fixtures 152 includes a cushion pan portion 156 and a back pan portion 158. The hip point fixtures 152 simulate, approximate, or otherwise replicate a torso portion of the hip point manikin 10. The cushion pan portion 156 corresponds to the cushion pan 12 and the back pan portion 158 corresponds to the back pan 14. The hip point fixture 152 further includes a hip point datum 160 locating a hip point of the vehicle seats 102 in a vertical X-Z plane.

As illustrated, each of the first and second displacement mechanisms 148A and 148B, respectively, is a linear displacement mechanism, indicated generally at 162, with a vertical (or up-down) cylinder 164 in the direction Z mounted on the gantry 150 and force application mechanism 166 secured to the vertical cylinders 164. As non-limiting examples, the vertical cylinders 164 and force application mechanisms 166 may be actuated mechanically such as by a mechanical screw, leadscrew, screw jack, ball screw, roller screw, wheel and axle, hoist, winch, rack and pinion, chain or belt drive, cam, hydraulically, pneumatically, or by one of the mechanical actuators driven by an electrical motor. The vertical cylinders 164 and force application mechanisms 166 may both have the same type of actuators or different.

In a first movement, each of the linear displacement mechanisms 162 displaces the attached hip point fixture 152 between the stand by position 154 and an intermediate position 167 using the vertical cylinder 164. In performing the first movement, the linear displacement mechanisms 162 displace, or lower, the hip point fixtures 152 negatively in the vertical direction Z. As illustrated, the displacement is substantially in the vertical direction Z only. Alternatively, the linear displacement mechanisms 162 may displace the attached hip point fixture 152 between the intermediate position 167 and the second test position 155 in both the vertical direction Z and horizontal direction X.

In a second movement, with the hip point fixtures 152 in the intermediate position 167, the linear displacement mechanism 162 displaces the hip point fixtures 152 into the vehicle seats 102 using the force application mechanism 166 to the second test position 155. Depressing of the hip point fixtures 152 into the vehicle seats 102 from the intermediate position 167 to the test position 155 simulates a load applied to the vehicle seats 102. In performing the second movement, the force application mechanisms 166 displace the hip point fixtures 152 negatively in both the horizontal and vertical directions X and Z, respectively. The linear displacement mechanisms 162, with the vertical cylinders 164 and force application mechanisms 166, perform the first and second movements for each of the seat preparation and detector stations 112 and 114, respectively. As will be discussed, with the hip point fixtures 152 depressed into the vehicle seats 102 in the test position 155, the third left or right side laser and optical receiver assembly 146A or 146B, respectively, locates the hip point fixture to determine the hip point location as-built coordinates.

As illustrated, a target insert 168 is placed in, or otherwise located over, the opening 132 of each of the vehicle seats 102 at the detector station 114 to locate a center point 170 of the opening 132. The target insert 168 provides a reflective surface for the left and right side second laser and receiver assemblies 144A and 144B, respectively, to shine on. The target insert 168 is necessary because the opening 132 is a deep hollow and thus not readily reflective. Alternatively, a different target for the left and right side second laser and receiver assemblies 144A and 144B, respectively, may be provided. As a non-limiting example, a target for the left and right side second laser and receiver assemblies 144A and 144B, respectively, may be provided on an outboard side of each of the vehicle seats 102. Such a target on the outboard side may be an adhesive target temporarily applied to each of the vehicle seats 102 or a target incorporated into finish trim of the vehicle seats 102. As will be discussed, with the target insert 168 inserted in the opening 132, the second left or right side laser and optical receiver assembly 144A or 144B, respectively, locates the target insert 168 to determine the pivot point as-built coordinates.

As illustrated in FIG. 4, the first left side laser and receiver assembly 142A shines a first laser beam 172A on the reference datum 138, the second left side laser and receiver assembly 144A shines a second laser beam 172B on the target insert 168, and the third left side laser and receiver assembly 146A shines a third laser beam 172C on the hip point fixture datum 160. In FIG. 4, the first, second, and third right side laser and receiver assemblies 142B, 144B, and 146B, respectively, are not shining laser beams because the left side and right side laser and receiver assemblies preferably do not shine laser beams on the same vehicle seats 102.

The passenger and driver side vehicle seats 102 have separate left and right side laser and optical receiver assemblies because the opening 132 is provided only on an inboard side of the vehicle seats 101 so the opening 132 is concealed from view when the vehicle seat 102 is installed in the vehicle. As a result, there is no opening 132 on an outboard side of the vehicle seats 101 to hold the target insert 168 for the second left and right side laser and optical receiver assemblies 144A and 144B, respectively. However, the first, second, and third right side laser and receiver assemblies 142B, 144B, and 146B, respectively, each shine laser beams similar to the illustrated first, second, and third laser beams 172A, 172B, and 172C, respectively.

The checking station 110 further includes an operator position 174 and a control panel 176. An operator utilizes the control panel 176 to operate the checking station 110. Preferably, operation of the checking station 110 is automated such that active intervention by the operator is not required during normal operation.

Figure 5:
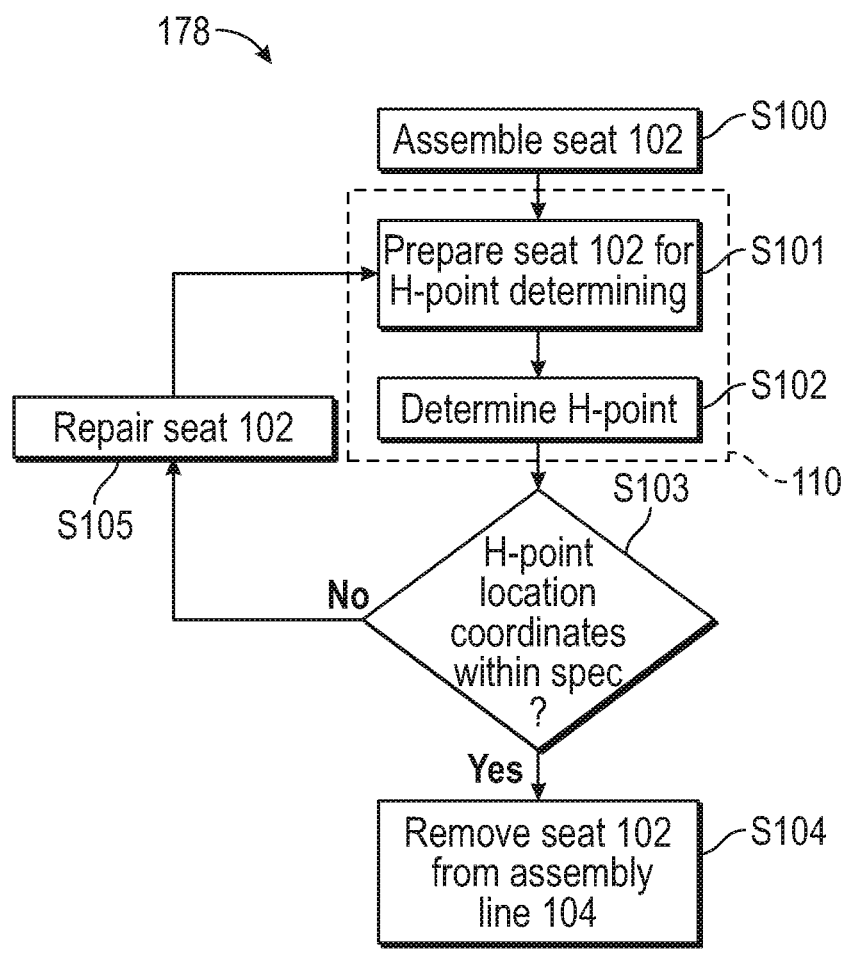
FIG. 5 is a flow chart of a method for checking seat coordinates using the checking station of FIG. 2.

Referring now to FIG. 5, there is illustrated a method, indicated generally at 178, for the checking station 110 to check or test a location of the hip point of the vehicle seats 102.

In a step S100, the vehicle seats 102 are assembled by the seat assembly stations 108. As discussed, after assembly is complete, the vehicle seats 102 advance on the conveyor 104 to the checking station 110 (represented in FIG. 5 by dashed lines). In a step S101, each of the vehicle seats 102 is prepared for determining as-built coordinates of the hip point location and, in a step S102, the hip point location as-built coordinates of each of the vehicle seats 102 are determined. Every vehicle seat 102 assembled by the seat assembly stations 108 has its hip point location as-built coordinates checked. Both the steps S101 and S102 will be discussed further with respect to FIGS. 5A and 5B, respectively.

In a step S103, the checking method 178 determines if the hip point location as-built coordinates for each of the vehicle seats 102 is within a specification for the hip point location. When the hip point location as-built coordinates are within the specification, the vehicle seats 102 are removed from the conveyor 104 in a step S104 by the seat removal station 116. After the step S104, the vehicle seats 102 are transferred to finished goods inventory 119 and subsequently installed in the vehicles in the vehicle installation station 122. When the hip point location as-built coordinates are not within the specification, the vehicle seats 102 are repaired in a step S105 by the seat repair station 118. After the step S105, the repaired vehicle seats 102 are again prepared in the step S101 for determining the hip point location as-built coordinates in the step S102.

Figures 5A, 5B:
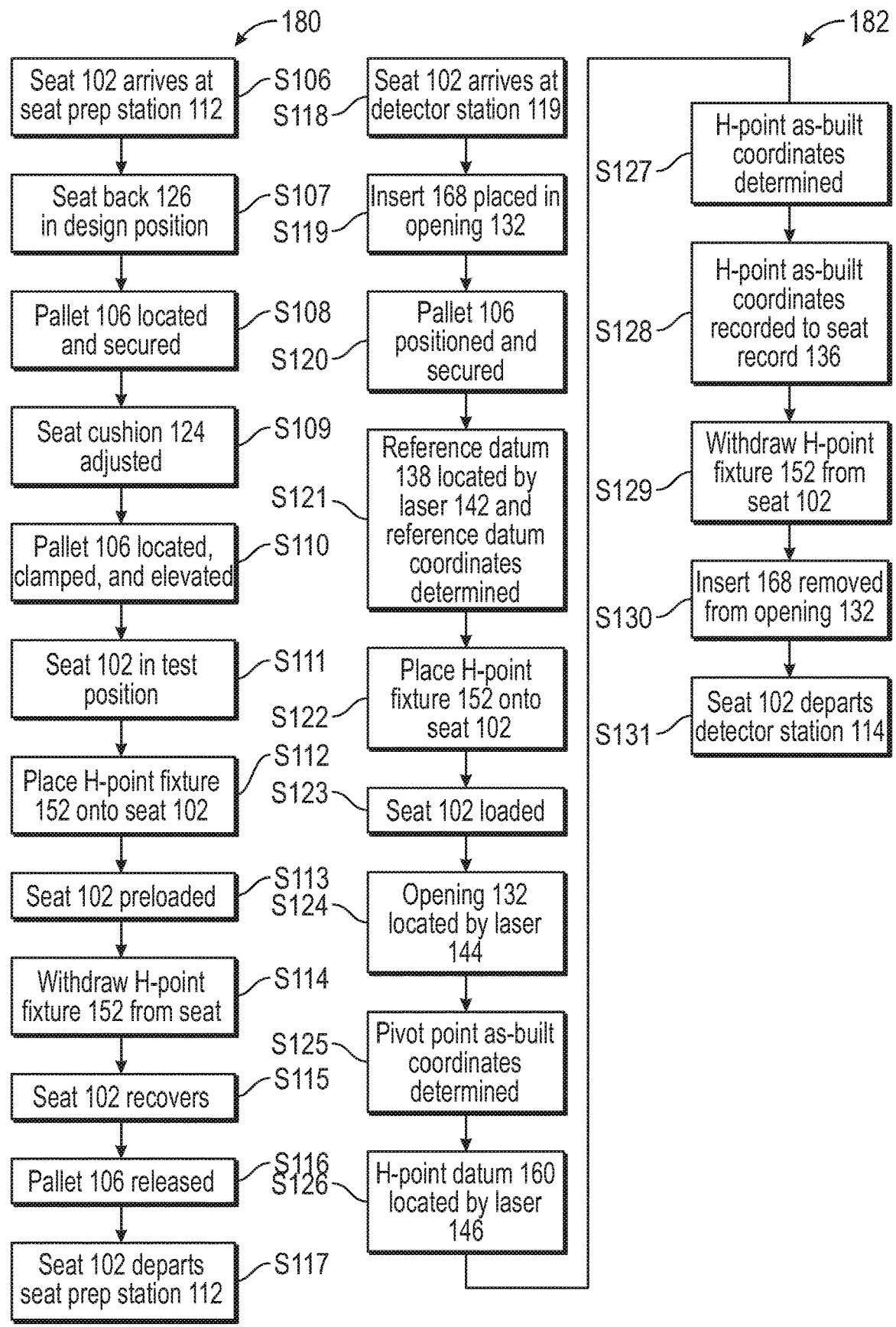
FIG. 5A is a flow chart of preparing the vehicle seat for the method of FIG. 5.
FIG. 5B is a flow chart of determining the as-built coordinates for the method of FIG. 5.

Referring now to FIG. 5A, there is illustrated a method, indicated generally at 180, for preparing the vehicle seats 102 for checking the location of the hip point. FIG. 5A illustrates the step S101 of FIG. 5 in detail.

First, each of the vehicle seats 102 is positioned by the seat preparation station 112. In a step S106, each of the vehicle seats 102 arrives at the seat preparation station 112 on the conveyor 104, specifically on the first conveyor portion 104A. Next, in a step S107, the seat back 128 of each of the vehicle seats 102 is placed in a design position—e.g., the seat back 128 is rotated about the pivot point 130 to the design position. The design position is a known reference position for which the specification for the hip point location and any other as-built coordinates are defined. As non-limiting examples, the seat test position may be full forward for a two-manual vehicle seat, full forward and full down for a four-way manual vehicle seat, and full forward and full down for a six-way power vehicle seat (wherein the power mechanism of the seat is used to adjust the seat). The seat back 128 may be manually placed in the design position by an operator of the seat preparation station 112. Alternatively, and preferably for any of the vehicle seats 102 having a power operated seat back, the seat preparation station 112 may directly operate the power operated seat back through a control interface with the vehicle seats 102.

Then, in a step S108, the retractable pins and clamps of the seat preparation station 112 locate and secure each of the pallets 106 in the X-Y plane. Preferably, each of the pallets 106 is first located by two cylinders or tapered pins to remove any clearances and then clamped in position to limit movement in the subsequent steps. Then, in a step S109, the seat cushion 124 is adjusted to the design position—e.g., the seat cushion is moved longitudinally in the horizontal direction X to the design position. Again, the seat cushion 124 may be adjusted manually or its adjustment may be automated and performed by the seat preparation station 112 without manual intervention. In a step S110, the secured pallets 106 are elevated above the conveyor 104 on the first lift mechanism 140A in the vertical direction Z. As a non-limiting example, each of the pallets 106 is elevated 0.5-1 inch. In a step S111, after being elevated in the step S110, the vehicle seats 102 are in a seat test position.

Next, each of the vehicle seats 102 is loaded by the seat preparation station 112. In a step S112, the first displacement mechanism 148A displaces its hip point fixture 152 from the first stand by position 154 to the intermediate position 167. In a step S113, the first displacement mechanism 148A depresses the hip point fixture 152 from the intermediate position 167 and into each of the vehicle seats 102 to the second test position 155 to preload and simulate a first load on the vehicle seats 102. As a non-limiting example, the first load may be 160-165 pounds applied for 120 seconds. The first load releases any gaps between support structure or framework, and cushioning foam or cushioning foam and trim, of the vehicle seats 102.

In the illustrated embodiment, the first displacement mechanism 148A displaces its hip point fixture 152 from the first stand by position 154, through the intermediate position 167, to the second test position 155. In an alternative embodiment, the intermediate position 167 may be omitted and the first displacement mechanism 148A displaces its hip point fixture 152 from the first stand by position 154 directly to the second test position 155 in which the hip point fixture 152 is depressed—i.e., loaded—into the vehicle seat 102.

Then, in a step S114, the hip point fixture 152 is withdrawn from the vehicle seats 102 by the first displacement mechanism 148A and, in a step S115, each of the vehicle seats 102 is left undisturbed to recover from the first load. As a non-limiting example, the recovery may be for 30 seconds.

After recovery, in a step S116, each of the pallets 106 are lowered in the vertical direction Z back onto the conveyor 104 and released by the clamps. In a step S117, the pallets 106 depart the seat preparation station 112 and are advanced by the second conveyor portion 104B to the detector station 114.

Referring now to FIG. 5B, there is illustrated a method, indicated generally at 182, for determining the as-built dimensional coordinates of the vehicle seats 102. FIG. 5B illustrates the step S102 of FIG. 5 in detail.

In a step S118, each of the vehicle seats 102 arrives on the conveyor 104 (specifically on the second conveyor portion 104B) at the detector station 114 from the seat preparation station 112. In a step S119, for each of the vehicle seats 102, the target insert 168 is placed in the opening 132. The target insert 168 may be placed in the opening 132 manually or by an automated mechanism. Then, in a step S120, the retractable pins and clamps of the detector station 114 locate and secure each of the pallets 106. Preferably, each of the pallets 106 is first located by two cylinders or tapered pins to remove any clearances and then clamped in position to limit movement in the subsequent steps. Each of the pallets 106 are then raised in the vertical direction Z above the conveyor 104 on the second lift mechanisms 140B (similar as for the seat preparation station 112). As a non-limiting example, each of the pallets 106 are again elevated 0.5-1 inch.

In a step S121, the first laser and optical receiver assembly 142A determines a location of the reference datum 138. A laser portion of the first laser and optical receiver assembly 142A shines a laser beam on the reference datum 138. The first laser and optical receiver assembly 163A moves on its servo mechanism as necessary to locate the reference datum 138. The laser beam is then reflected back from the reference datum 138 to an optical receiver portion of the first laser and optical receiver assembly 142A.

With a position of components of the first laser and optical receiver assembly 142A being known, the detector station 114 uses the reflected laser beam to determine reference datum as-built coordinates for the reference datum 138. (While the reference datum as-built coordinate is referred to herein as an "as-built" coordinate, the reference datum is not built in the sense the vehicle seats 102 are. However, for clarity, all coordinates determined by the checking station 110 are referred to as "as-built" coordinates.) The detector station 114 records the reference datum as-built coordinates as a position of each of the pallets 106. In an alternative embodiment, when the second and third laser and optical receiver assemblies 144A and 146A, respectively, are indexed to a position of the pallets 106 in the detector station 114, the step S121 may be omitted.

With the reference datum as-built coordinates determined, the detector station 114 loads each of the vehicle seats 102. In a step S122, the second displacement mechanism 148B displaces its hip point fixture 152 from the first standby position 154 to the intermediate position 167. Then, in a step S123, the displacement mechanism depresses its hip point fixture 152 from the test position 155 and into each of the vehicle seats 102 to the second test position 155 to simulate a second load. As a non-limiting example, the second load may be 160-170 pounds.

Again, in the illustrated embodiment, the first displacement mechanism 148B displaces its hip point fixture 152 from the first stand by position 154, through the intermediate position 167, to the second test position 155. In an alternative embodiment, the intermediate position 167 may be omitted and the first displacement mechanism 148B displaces its hip point fixture 152 from the first stand by position 154 directly to the second test position 155 in which the hip point fixture 152 is depressed into the vehicle seat 102.

With the vehicle seat 102 loaded, in a step S124, the pivot point 130 is located (using the target insert 168) by the second laser and optical receiver assembly 144A and the pivot point as-built coordinates are determined. The second laser and optical receiver assembly 144A determines the pivot point as-built coordinates in a manner similar to the first laser and optical receiver assembly 142A determining the reference datum as-built coordinate. Then, in a step S125, the detector station 114 defines the pivot point as-built coordinates as X1 and Z1 (shown in FIG. 3) relative to the reference datum as-built coordinates.

With the vehicle seat 102 still loaded, in a step S126, the hip point datum 160 is located by the third laser and optical receiver assembly 146A and the hip point location as-built coordinates are determined. The third laser and optical receiver assembly 146A determines the hip point location as-built coordinate in a manner similar to the first laser and optical receiver assembly 142A determining the reference datum as-built coordinate. Then, in a step S127, the detector station 114 defines the hip point location as-built coordinate as X2 and Z2 (shown in FIG. 3) relative to the pivot point as-built coordinates. Additionally, the hip point location as-built coordinate may be defined relative to the reference datum 138 by summing X1 and X2 and Z1 and Z1. Or, with the reference datum 138 fixed relative to the coordinate system, the hip point location as-built coordinate may be defined relative to any other point. In a step S128, the hip point location as-built coordinate for each of the vehicle seats 102 is recorded to the seat record 136 for each of the vehicle seats 102.

As a non-limiting example, the required specification for the hip point location may be defined as a distance or measurement between the pivot point 130 and the hip point datum 160—i.e., the specification is defined as values for X2 and Z2 in FIG. 3.

In a step S129, the second displacement mechanism 148B withdraws the hip point fixture 152 from each of the vehicle seats 102 to the standby position 154. In a step S130, the target insert 168 is removed from the opening 132. In a step S131, each of the pallets 106 are lowered in the vertical direction Z on the second lift mechanism 140B to the conveyor 104, the clamps are released, and each of the vehicle seats 102 departs the detector station 114 on the conveyor 104.

As discussed, the determining method 182 determines the as-built coordinates from the left side 106A. Alternatively, the determining method 182 may determine the as-built coordinates from the right side 106B by utilizing the first, second, and third right side laser and optical receiver assemblies 142B, 144B, and 146B, respectively, in lieu of the discussed first, second, and third left side laser and optical receiver assemblies 142A, 144A, and 146A, respectively Additionally, in the discussed embodiments, the pallets 106 advance to the seat preparation station 112, stop in the seat preparation station 112 during preparation of the vehicle seats 102, advance to the detector station 114, stop in the detector station 114 during determining of the as-built coordinates, and then advance from the detector station 114. In an alternative embodiment, the pallets 106 may continuously advance or move through the seat preparation station 112 and detector station 114 such that the pallets 106 do not stop advancing or moving. As used herein, "continuously advance" means the pallets 106 do not stop moving through the preparation station 112 or detector station 114 while the preparation station 112 prepares the vehicle seats 102 and the detector station 114 determines as built coordinates of the vehicle seats 102. When the pallets 106 continuously advance through the seat preparation station 112 and detector station 114, the first and second lift mechanisms 140A and 140B, respectively, the left and right side first, second, and third laser and receiver assemblies 142A, 142B, 144A, 144B, 146A, and 146B, respectively, and first and second displacement mechanisms 148A and 148B, respectively, are mounted such that they advance or move with the pallet 106 while performing their discussed functions for a given vehicle seat and then reset their position for a next vehicle seat.

Figure 6:
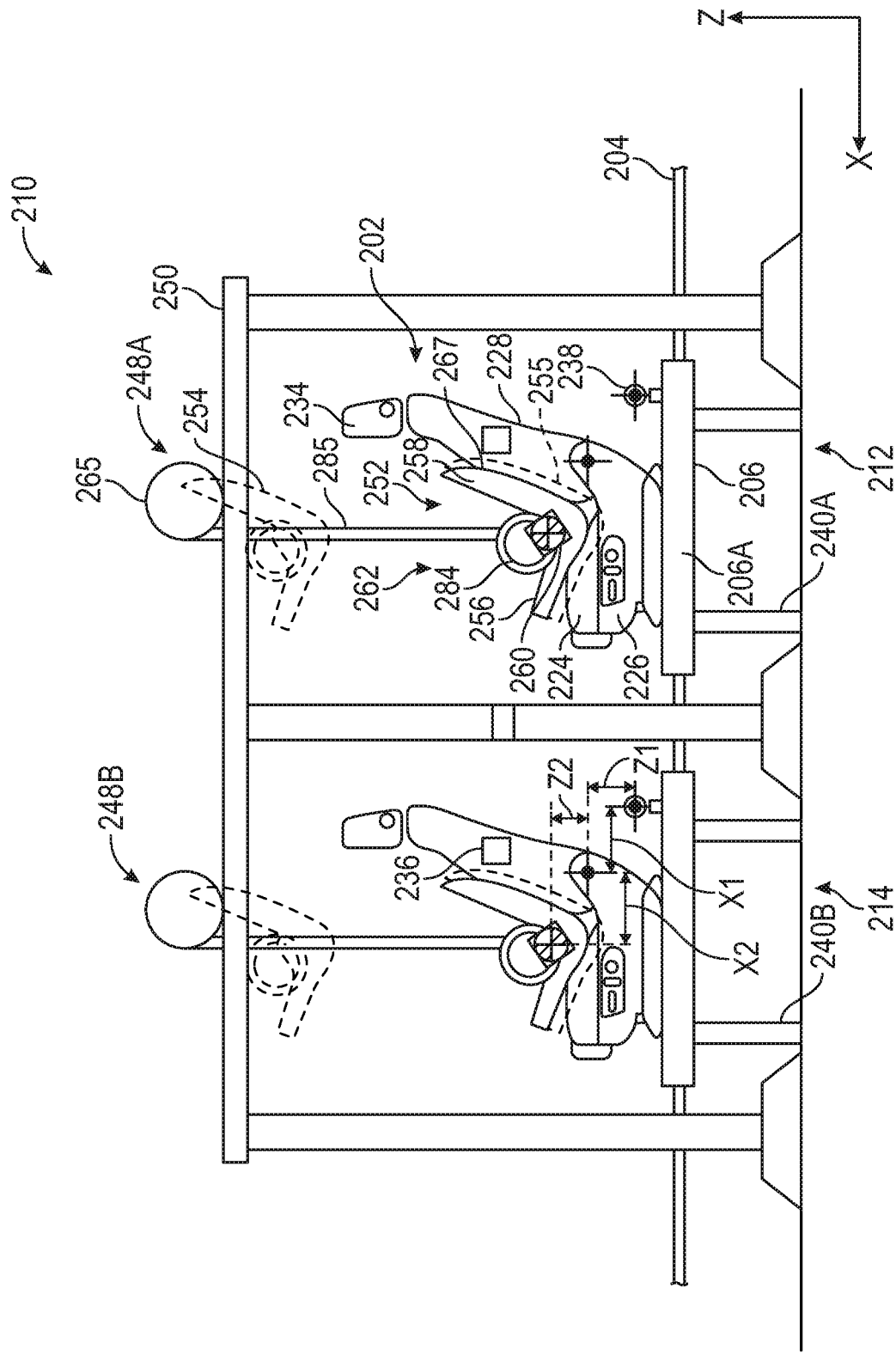
FIG. 6 is a side elevation view of a checking station with weight block load application for a production line for vehicle seats in accordance with a second embodiment of this invention.

Referring now to FIG. 6, there is illustrated a checking station 210 for a second embodiment of a production line for vehicle seats, indicated generally at 202. Because the production line 202 of FIG. 6 is a variation of the production line 100 of FIGS. 2-5B, like reference numerals, increased by 100, designate corresponding parts in the drawings and detailed description thereof will be omitted.

First and second displacement mechanisms 248A and 248B, respectively, include weight block mechanisms 284 secured to each of the hip point fixtures 252. The hip point fixtures 252, with the weight block mechanism 284, are secured to the first and second displacement mechanisms 248A and 248B, respectively, by chains or cables 285—i.e., the hip point fixtures 252 are hung or suspended from the first and second displacement mechanisms 248A and 248B, respectively. The weight block mechanisms 284 use gravity to apply loads—e.g., the first and second loads of the preparation and determining methods 180 and 182, respectively—through the hip point fixtures 252 to each of the vehicle seats 202. The loads applied by the weight block mechanisms 284 are from weight of the weight block mechanisms 284 themselves—i.e., the weight block mechanisms 284 act as weight or ballast on the hip point fixtures 252. As a non-limiting example, each of the weight block mechanisms 284 weighs 160-170 pounds. The loads are applied to the vehicle seats 202 when winches 265 lower the hip point fixtures 252 negatively in a direction Z into the vehicle seats 202 until the chains 285 go slack or otherwise become untensioned. The loads are withdrawn from the vehicle seats 202 when the winches 265 raise the hip point fixtures 252 positively in the direction Z from the vehicle seats 202.

Figure 7:
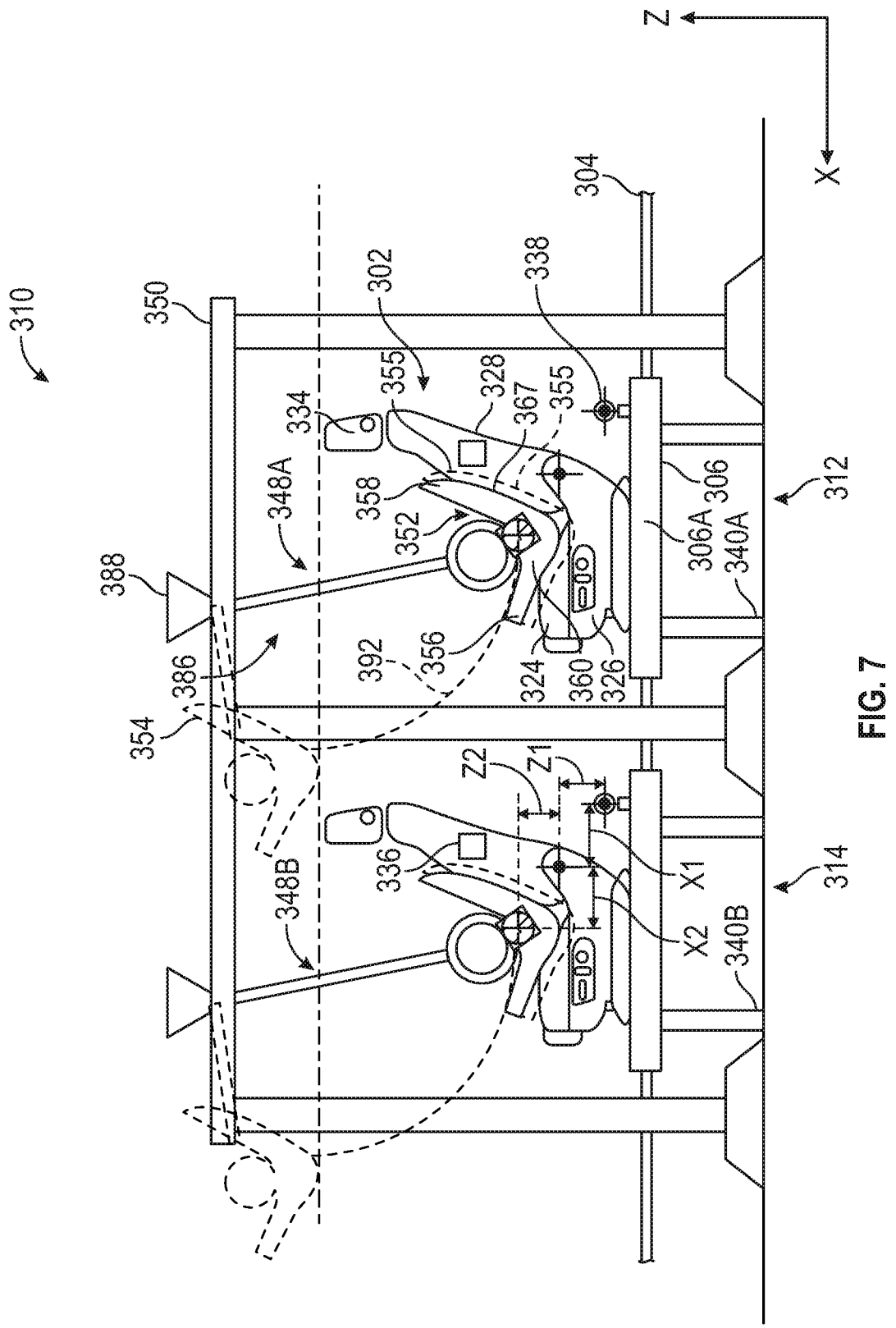
FIG. 7 is a schematic view of a checking station with angular displacement for a production line for vehicle seats in accordance with a third embodiment of this invention.

Referring now to FIG. 7, there is illustrated a checking station 310 for a third embodiment of a production line for vehicle seats, indicated generally at 200. Because the production line 200 of FIG. 7 is a variation of the production line 100 of FIGS. 2-5B, like reference numerals, increased by 200, designate corresponding parts in the drawings and detailed description thereof will be omitted.

First and second displacement mechanisms 348A and 348B, respectively, are angular displacement mechanisms, indicated generally at 386. Each of the angular displacement mechanisms 386 includes a pivot motor 388 that rotates an arm or boom 390 along an arc 392 from a first standby position 354 to an intermediate position 367. Hip point fixtures 352 are secured to the arms 390. The angular displacement mechanisms 386 rotationally displace the hip point fixtures 352 along the arcs 392 negatively in both a horizontal direction X and a vertical direction Z, wherein the horizontal and vertical directions X and Z are perpendicular. In alternative embodiments, one of the seat preparation or detector stations 312 or 314, respectively, may have a linear displacement mechanism while the other of the seat preparation or detector stations 312 or 314, respectively, has the angular displacement mechanism 386.

In a further alternative embodiment, the first and second displacement mechanisms 348A and 348B, respectively, may have a linear displacement mechanism (such as the linear displacement mechanism 162) linearly displacing the hip point fixtures 352 from the first standby position 354 to the intermediate position 367 and an angular displacement mechanism (such as the angular displacement mechanism 386) displacing the hip point fixtures 352 from the intermediate position 367 to a second test position 355. In a further alternative embodiment, the angular displacement mechanisms 386 may displace the hip point fixtures 352 from the first standby position 354 directly to the second test position 355 while omitting the intermediate position 367.

Figure 8:
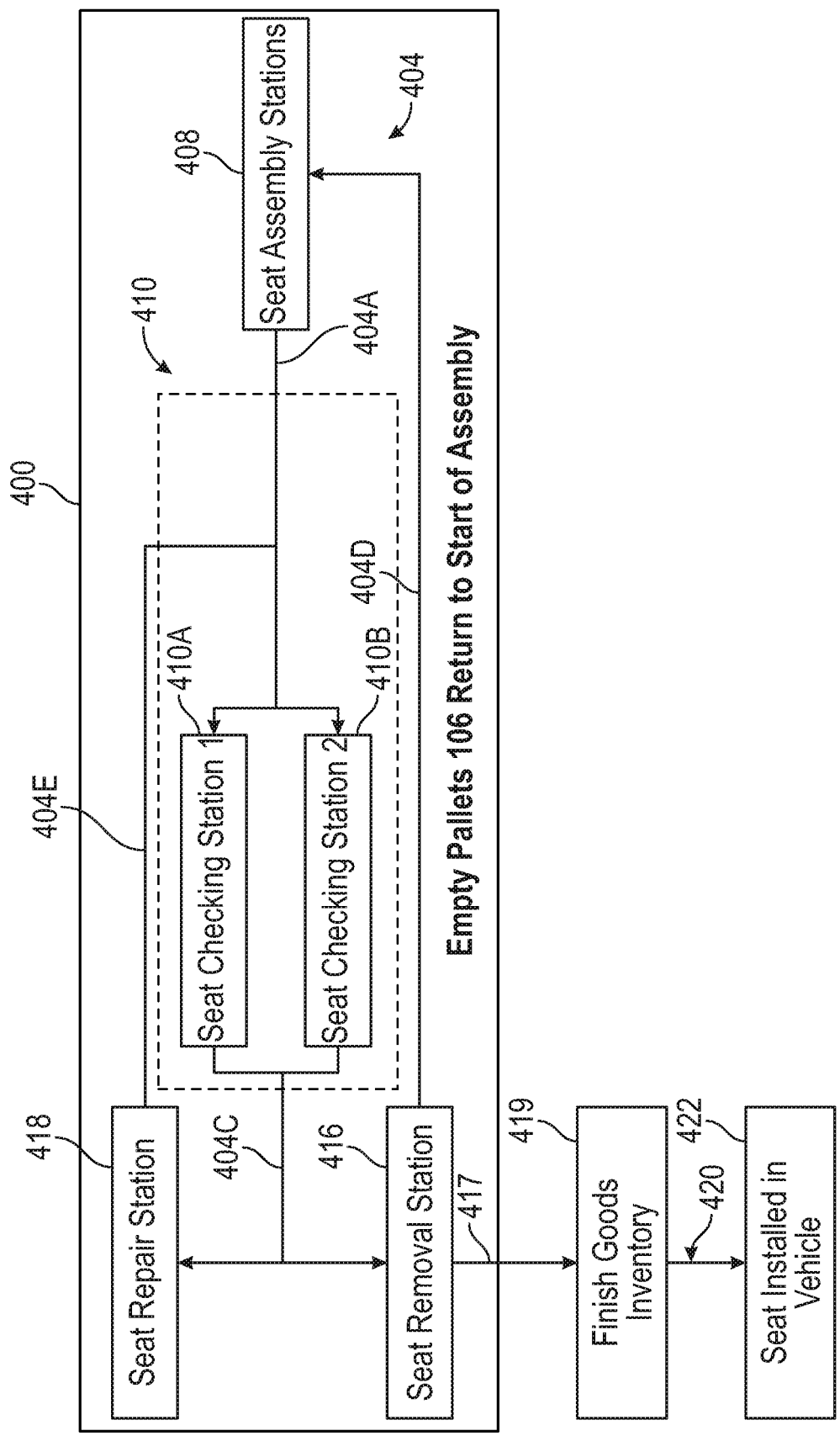
FIG. 8 is a schematic view of a production line for vehicle seats, the production line having a checking station in accordance with a fourth embodiment of this invention.

Referring now to FIG. 8, there is illustrated a fourth embodiment of a production line 400 for vehicle seats. Because the production line 400 is a variation of the production line 100 of FIGS. 2-5B, like reference numerals, increased by 300, designate corresponding parts in the drawings and detailed description thereof will be omitted.

The production line 400 includes a checking station, indicated generally at 410, having first and second seat checking stations 410A and 410B, respectively. Each of the first and second seat checking stations 410A and 410B, respectively, combine the separate seat preparation station 112 and detector station 114 into single stations while omitting the second conveyor portion 104B. The vehicle seats arrive at the first or second seat checking stations 410A or 410B, respectively, for preparation to check a location of the hip point and do not advance to a subsequent station on an conveyor 404 until the hip point location has been checked.

Although illustrated as multiple checking stations, a single combined checking station may be provided instead. The single combined checking station may be preferably used when seat production is at a seat assembly plant that is at a different geographic location than the assembly plant.

Figure 9:
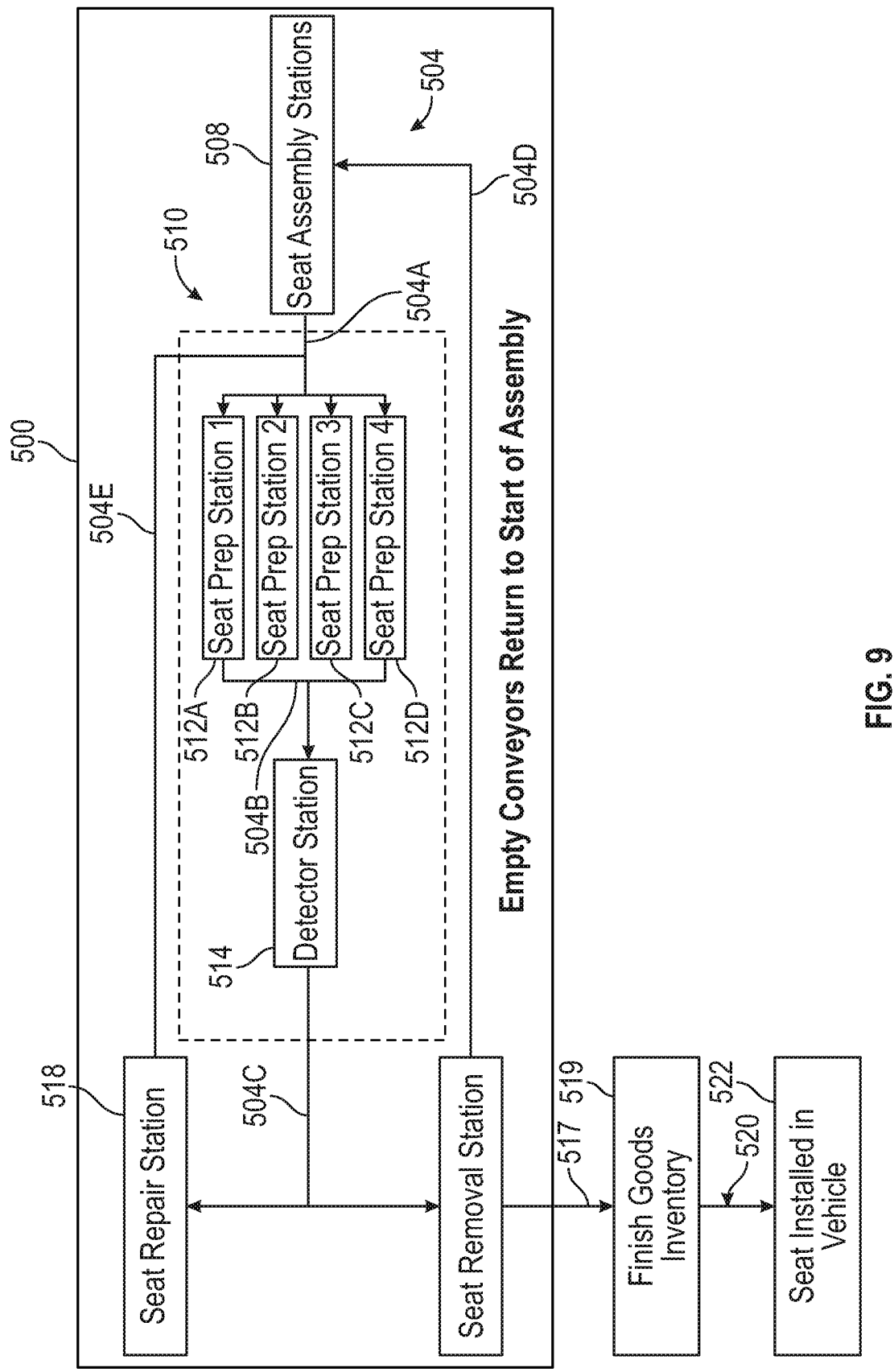
FIG. 9 is a schematic view of a production line for vehicle seats, the production line having a checking station in accordance with a fifth embodiment of this invention.

Referring now to FIG. 9, there is illustrated a fifth embodiment of a production line 500 for vehicle seats. Because the production line 500 is a variation of the production line 100 of FIGS. 2-5B, like reference numerals, increased by 400, designate corresponding parts in the drawings and detailed description thereof will be omitted.

The production line 500 includes a checking station, indicated generally at 510, having first, second, third, and fourth seat preparation stations 512A, 512B, 512C, and 512D, respectively, and a single detector station 514. The production line 500 accommodates a seat preparation time for the first, second, third, and fourth seat preparation stations 512A, 512B, 512C, and 512D, respectively, that is longer than a cycle time at which the vehicle seats advance through seat assembly stations 508, when the vehicle seats advance through the detector station 514 at the cycle time.

A ratio of the first, second, third, and fourth seat preparation stations 512A, 512B, 512C, and 512D, respectively, to the detector station 514 is equal to a ratio of the seat preparation time to the cycle time. Although the production line 500 for a cycle time of 30 seconds and a seat preparation time of 120 seconds is illustrated in FIG. 9, the cycle time and seat preparation time may be any duration. In FIG. 9, the completed vehicle seats advance to whichever of the first, second, third, and fourth seat preparation stations 512A, 512B, 512C, and 512D, respectively, is available rather than be delayed because the seat preparation time is greater than the cycle time. An conveyor second portion 504B advances the vehicle seats from the first, second, third, and fourth seat preparation stations 512A, 512B, 512C, and 512D, respectively, to the single detector station 514.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A production line for vehicle seats, the production line comprising:
    a first conveyor for advancing each of the vehicle seats to a checking station after assembly, the checking station including:
        a displacement mechanism for displacing a hip point fixture between a first standby position and a second test position in which the hip point fixture may be depressed into each of the vehicle seats to simulate a load; and
        a detector for determining as-built coordinates relating to each of the assembled vehicle seats, at least one such as-built coordinate being determined from a location on the hip point fixture; and
    a second conveyor for advancing each of the checked seats to a subsequent station, the nature of the subsequent station depending on the determined as-built coordinates.

2. The production line of claim 1 wherein the detector further comprises:
    a laser and optical receiver assembly that determines the at least one as-built coordinate determined from the location on the hip point fixture.

3. The production line of claim 1 wherein the detector further comprises:
    a laser and optical receiver assembly that determines a second as-built coordinate from a reference datum for each of the vehicle seats.

4. The production line of claim 1 wherein the detector further comprises:
    a laser and optical receiver assembly that determines a second as-built coordinate from a pivot point of each of the vehicle seats.

5. The production line of claim 1 wherein the displacement mechanism linearly displaces the hip point fixture between the first standby position and the second test position.

6. The production line of claim 1 wherein the displacement mechanism linearly displaces the hip point fixture between the first standby position and an intermediate position and angularly displaces the hip point fixture between the intermediate position and the second test position.

7. The production line of claim 1 wherein the displacement mechanism angularly displaces the hip point fixture between the first standby position and an intermediate position and linearly displaces the hip point fixture between the intermediate position and the second test position.

8. The production line of claim 1 wherein the displacement mechanism angularly displaces the hip point fixture between the first standby position and the second test position.

9. The production line of claim 1 further comprising:
    a weight block mechanism of the displacement mechanism;
    an intermediate position of the hip point fixture between the first standby position and the second test position, wherein the weight block mechanism displaces the hip point fixture from the intermediate position to the second test position.

10. The production line of claim 1 wherein the displacement mechanism is a first displacement mechanism, the hip point fixture is a first hip point fixture, the load is a first load, and the checking station further comprises:
    a seat preparation station including the first displacement mechanism, the first hip point fixture, and the first hip point fixture simulating the first load; and
    a detector station including:
        a second displacement mechanism for displacing a second hip point fixture between a third standby position and a fourth test position in which the second hip point fixture is depressed into each of the vehicle seats to simulate a second load.

11. The production line of claim 1 further comprising:
    at least one assembly station for assembling the vehicle seats, wherein the first conveyor advances the assembled vehicle seats from the at least one assembly station to the checking station.

12. A method of checking as-built coordinates of a plurality of assembled vehicle seat, the method comprising the steps of:
    receiving each of the vehicle seats of the plurality of vehicle seats at a checking station;
    displacing a hip point fixture between a first standby position and a second test position in which the hip point fixture is depressed into each of the vehicle seats to simulate a load; and
    determining the as-built coordinates relating to each of the vehicle seats, at least one such as-built coordinate being determined from a location on the hip point fixture.

13. The method of claim 12 wherein the as-built coordinate is determined using a laser and optical receiver assembly.

14. The method of claim 12 wherein the hip point fixture is linearly displaced between the first standby position and the second test position.

15. The method of claim 12 wherein the hip point fixture is linearly displaced between the first standby position and an intermediate position and angularly displaced between the intermediate position and the second test position.

16. The method of claim 12 wherein the hip point fixture is angularly displaced between the first standby position and an intermediate position and linearly displaced between the intermediate position and the second test position.

17. The method of claim 12 wherein the hip point fixture is angularly displaced between the first standby position and the second test position.

18. The method of claim 12 further comprising:
    installing each of the checked vehicle seats in a vehicle when at least one as-built coordinate for each of the checked vehicle seats is within a specification.

19. The vehicle seat of claim 12 wherein the as-built coordinates determined from the location on the hip point fixture is recorded to a record for the vehicle seat.

20. A vehicle seat whose as-built coordinates have been checked by the method of claim 12.

* * * * *